A. F. WHITING.
Improvement in Key-Bushes for Locks.

No. 128,266.                  Patented June 25, 1872.

Witnesses.
A. Ruppert
J. W. Mister

Inventor.
Andrew F. Whiting
Edson Brothers
Attorneys 128,266

UNITED STATES PATENT OFFICE.

ANDREW F. WHITING, OF CRESTLINE, OHIO.

IMPROVEMENT IN KEY-BUSHES FOR LOCKS.

Specification forming part of Letters Patent No. 128,266, dated June 25, 1872.

Specification describing a certain Improvement in Key-Bushes, invented by ANDREW F. WHITING, residing at Crestline, in the county of Crawford and State of Ohio.

This invention relates to key-bushes for plate keys; and it consists in bending such bushes up from sheet metal into the form of a split cylinder, making the journal ends slightly elastic, so that they may be "sprung" into their bearings, and having downwardly-projecting parallel flanges along the edges of the slit through which the bit of the key passes. The ends of this hollow split cylinder constitute the journals upon which the bush is turned in the eyes of the plates of the lock-case; and the object of making the bush of sheet metal is to allow the bush to be "sprung" into the eyes in the plates, and thus cause the journal ends to bind on their bearing-surfaces with sufficient friction to prevent the accidental displacement or disarrangement of its slot between the projecting flanges after the withdrawal of the key, which would preclude a subsequent insertion of the key. When made of cast metal, as heretofore, the journal ends of the bushes soon become loose in their bearings, and a slight jar of the lock is liable to disturb the position of the slot with reference to the key-hole, so that the key cannot be inserted until the bush has been, by some means, returned to its proper position. This objection is removed by making these bushes of sheet metal in the manner proposed, for the tendency of the split cylinder to expand will compensate for the slight wear at the bearings, so that the bush will remain tight therein, and always remain in the position in which it is left by the withdrawal of the key.

Figure 1:
Figure 2:
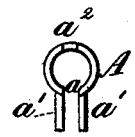

Figure 1 represents a perspective view of my improved bush with a plate key inserted in it. Fig. 2 is an end view thereof.

The same letters of reference are used in both figures in the designation of identical parts.

The bush is made from blanks of the required form, cut out of sheet metal of proper thickness to give slight elasticity to the finished product. When properly bent up it consists of a split hollow cylinder, A, which is made of sufficient length to span the lock-case and enter with its ends into the bearings or eyes bored in the plates of the case for the purpose. That portion of the bush which is between the interior surfaces of the plates of the lock-case is provided along the edges of the slit $a$ with projecting parallel flanges $a'$ $a''$, which are intended to retain the bush in position in the lock-case, and which also serve as bearings to steady the bit of the key. The space between the flanges corresponds with the slit $a$ in the bush and that portion of the key-hole through which the bit of the key is inserted. The bearings or eyes in the plates of the lock-case are made slightly smaller in diameter than the journal ends of the bush, and the latter, in inserting them, are slightly compressed. The moment the journals are in their bearings the pressure is removed from the bush, when it will expand, causing its journals to bind firmly against their bearing-surfaces, so as to hold the bush firmly in the position in which the key leaves it. A notch, $a^2$, is formed in one or both ends of the bush for the reception of a shoulder on the key, in the manner shown in Fig. 1. These bushes will be made in sets, fitting all sizes of locks.

What I claim as my invention, and desire to secure by Letters Patent, is—

The herein-described sheet-metal key-bush, composed of a hollow split cylinder having elastic journal ends, substantially as and for the purpose specified.

In testimony whereof I have hereunto signed my name this 2d day of April, A. D. 1872, in presence of two subscribing witnesses.

ANDREW F. WHITING.

Witnesses:
E. A. CRUMB,
FRANK WHITING.